R. SPENCER.
SADDLE AND SWEAT CLOTH.
No. 7,557. Reissued March 13, 1877.
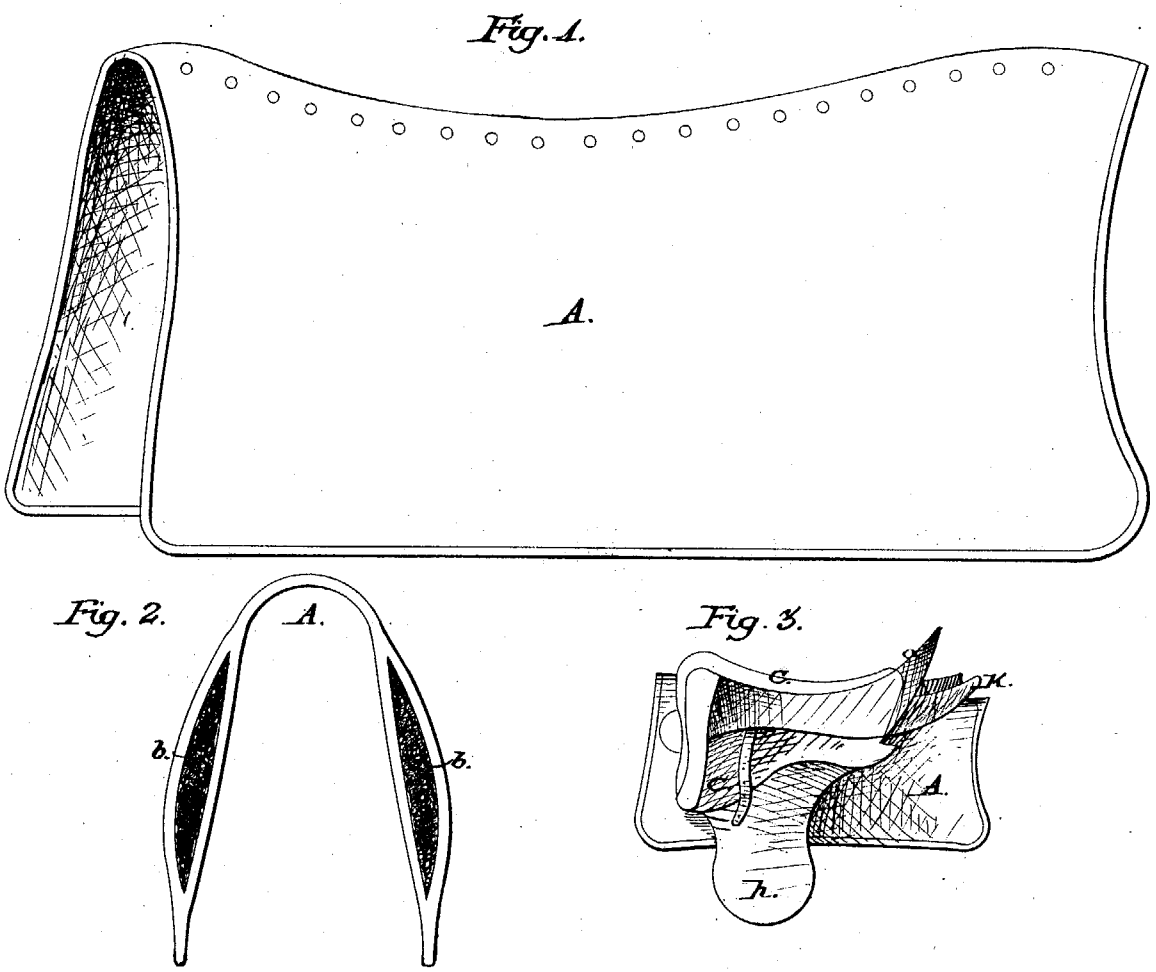
Witnesses:
Philip R. Forrest
T. P. Bucher
Inventor:
Robt. Spencer
N. PETERS, PHOTO-LITHOGRAPHER, WASHINGTON, D. C.

UNITED STATES PATENT OFFICE.

ROBERT SPENCER, OF NEWARK, NEW JERSEY.

IMPROVEMENT IN SADDLE OR SWEAT CLOTHS.

Specification forming part of Letters Patent No. 41,944, dated March 15, 1864; reissue No. 4,358, dated April 25, 1871; reissue No. 7,557, dated March 13, 1877; application filed June 22, 1875.

*To all whom it may concern:*

Be it known that I, ROBERT SPENCER, of the city of Newark, in the county of Essex and State of New Jersey, have invented a new and useful Improvement in Saddle or Sweat Cloths for military and other purposes; and I do hereby declare that the following is a full, clear, and exact description of the same, reference being had to the accompanying drawing, making a part of this specification, in which—

Figure 1 is a perspective view of my said cloth. Fig. 2 is a transverse section; and Fig. 3 shows various modifications of my said invention when applied under, or in connection with, the saddle.

Heretofore, saddle-cloths have been made of two or more pieces of material stitched together, and presenting a seam along the ridge or back of the horse, to the injury, oftentimes, of both horse and rider.

The first object of my invention is to avoid the difficulty arising from this seam. I manufacture these saddle-cloths wholly in one piece, and thus render them stronger and more serviceable.

The cloth has, also, heretofore been made either of a single thickness or by stitching two or more parts one upon the other—a method open to objection on the score of expense and want of uniformity or graduation of the cloth.

The second object of my invention is to produce a cloth thoroughly graduated as to thickness, strong and serviceable, without seam or ridge, shaped to the back of the horse, and in every respect adapted to its purpose. The object is, further, to make such a combination of materials in making the cloth introduced, and worked in in such a manner as to produce in the cloth all the essential qualifications necessary in those respects—viz., cheapness, strength, lightness, elasticity, absorption, and ventilation.

In the drawing, A is the cloth, shaped, as represented in Fig. 1, to the outline of the back of the horse, and Fig. 2 is a cross-section of one of the cloths on which the sides are graduated.

The cloth may be formed of any suitable material, (wool or camel's hair being preferred,) and felted and pulled in the usual and required manner, or it may be woven in any suitable and convenient way.

Horse or cattle hair may be introduced to thicken and form the bearings *b b*, Fig. 2, or the same may be made up of successive layers of felt or other fabric, as experience may show to be the best.

In Fig. 3 the cloth A is secured to the saddle by means of the pockets K K, already patented, and the exterior felt C C is only the modification of A placed over the saddle to form a seat for the rider; or it may be extended over the whole saddle, to form a housing; or it may be brought down or extended, as represented by *h*, Fig. 3, to take the place of, or form, the flaps of the saddle.

The cloth *h* does not extend beyond the back and front of the saddle, which is sometimes desirable when I wish to use a pad or simple lining instead of a full-sized saddle-cloth, (represented at A.)

What I claim as my invention, and desire to secure by Letters Patent, is—

1. As a new article of manufacture, a graduated saddle-cloth in which the varying thickness of the different parts is produced in the process of manufacture, either by felting or weaving, substantially as described, as distinguished from a saddle-cloth in which the varying thickness is produced by sewing or stitching on pads or thickening, as was formerly done.

2. As a new article of manufacture, a graduated saddle-cloth in which the two similar sides are practically united in the process of manufacture, by felting or weaving, substantially as described, as distinguished from one in which the two similar sides were separately made, and then united with each other by stitching or sewing.

3. As a new article of manufacture, a graduated cloth, to be used between the saddle and the horse, which does not extend beyond the back and front of the saddle, in which the two similar sides are practically united in the process of manufacture, by felting or weaving, substantially as described, as distinguished from one in which the two similar sides are separately made, and then united with each other by stitching or sewing.

ROBT. SPENCER.

Witnesses:
E. N. DECKERSON, JR.,
JNO. R. LEFFERTS.